E. C. BOHLMANN.
VARIABLE SPEED POWER TRANSMISSION.
APPLICATION FILED NOV. 8, 1918.
1,305,871.
Patented June 3, 1919.
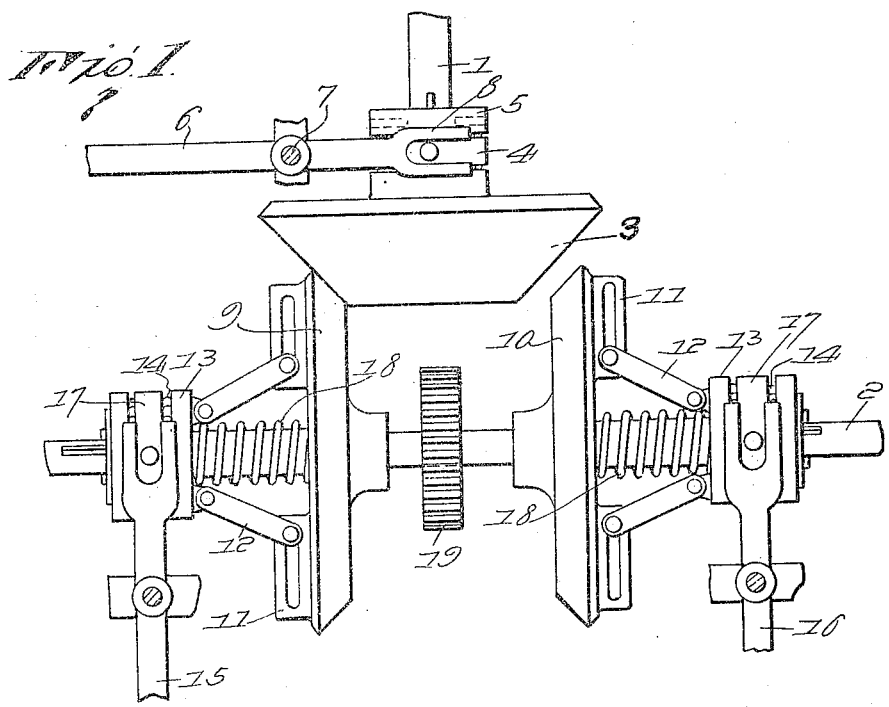
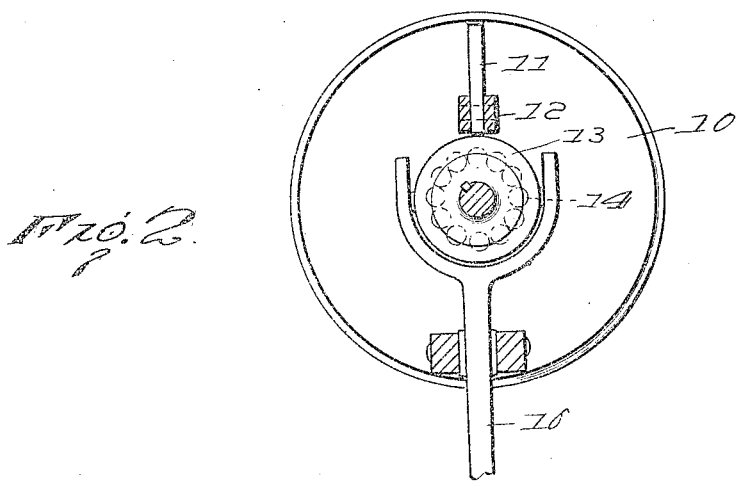
Edward C. Bohlmann, Inventor
By Geo. P. Kimmel, Attorney

UNITED STATES PATENT OFFICE.

EDWARD C. BOHLMANN, OF EXCELSIOR, MINNESOTA.

VARIABLE-SPEED POWER TRANSMISSION.

1,305,871.   Specification of Letters Patent.   Patented June 3, 1919.

Application filed November 8, 1918. Serial No. 261,647.

*To all whom it may concern:*

Be it known that I, EDWARD C. BOHLMANN, a subject of the Emperor of Germany, residing at Excelsior, in the county of Hennepin and State of Minnesota, have invented certain new and useful Improvements in Variable-Speed Power Transmissions, of which the following is a specification.

This invention relates to improvements in variable speed power transmission gearing and it is the principal object of the invention to provide a power transmission gearing of the friction gear type whereby a plurality of different driving relations between the driving and driven elements thereof can be effected without intricate gear shifting operations such as are now necessary in the forms of selective transmission gearing now prevalent in the art.

Another and equally important object of the invention is to provide the driven elements of the transmission with a novel form of compensating levers whereby sufficient relative movement between the same and the driving element will be permitted during the shifting of the latter in order that proper engagement between these elements will be effected whereby to establish the desired driving relation, hence, requiring the shifting of but one element of the transmission by an operator.

Other objects will be in part obvious and in part pointed out hereinafter.

The improvements in the details and arrangement of parts will be apparent from an inspection of the accompanying drawings when considered in connection with the specific description hereinafter contained and wherein a preferred embodiment of the invention is shown for the purpose of imparting a full understanding thereof.

In the drawings:

Figure 1 is a side elevation of the improved gearing, and

Fig. 2 is a vertical transverse section therethrough.

Having more particular reference to the drawings, in connection with which like reference characters will designate corresponding parts throughout the several views, the numerals 1 and 2 designate the driving and driven shafts respectively, it being noted that the driving shaft 1 is arranged intermediate the driven shaft 2 and is disposed at substantially right angles thereto. Splined to that end of the driving shaft 1 in proximity to the driven shaft 2 is a beveled friction gear 3, said gear being provided with a suitable form of collar 4 having anti-frictional bearing means 5 engaged therewith whereby to compensate for the thrust imparted thereto; an operating lever 6 being mounted as at 7 adjacent the collar 5 and having a yoke 8 formed on its inner end to permit connection between the collar 4 and the same in order that the shifting of the friction gear 3 on the driving shaft 1 to establish the desired driving relations will be provided for.

Beveled driven friction gears 9 and 10 are splined to the intermediate portion of the driven shaft 2 and, as will be understood, are adapted to contact, at times, with the driving gear 3 whereby to permit the stepping of motion from the driving shaft 1 to the driven shaft 2. Slotted webs 11 are arranged on the rear or opposite sides of the driven gears 10 and have the ends of links 12 pivotally and slidably engaged therein, the remaining ends of these links being pivoted to bearing lugs formed on the adjacent sides of collars 13, which collars are supplied with suitable anti-frictional bearings 14 and have connection with operating levers 15 and 16, which levers, as will be noted, have forks formed on their inner ends and engaged with the yokes 17 rotatably mounted on the collars 13. Expansible coiled springs 18 are interposed between the several driven gears 9 and 10 and their respective collars 13 and in consequence, afford a form of compensating means whereby to allow movement of the same with relation to the driving gear 3 during shifting of the latter for obtaining the desired driving relation. Due to the provision of this form of compensating means, it of course will be understood that the shifting of the driven gears 9 and 10 during the shifting of the driving gear 3 to obtain a certain driving relation therebetween will be eliminated, since said driven gears will be allowed to move laterally with respect to the driving gear and in consequence will insure proper contact between the same and the beveled engaging surface of said driving gear.

If desired, I may and preferably do fixedly mount on that portion of the driven shaft 2 between the driven gears 9 and 10 a gear 19 whereby connection between the driven shaft and some suitable mechanism can be made. However, it will of course be understood in this connection that various forms of power transmitting means can be arranged on the driven shaft 2, such as conditions or preference may dictate.

In operation, to obtain a certain driving relation between the driving shaft and driven shaft in a forward direction, the driven gear 9 is moved inwardly on its shaft 2 by operating the lever 15 whereupon the driving gear 3 is moved downwardly on its respective shaft by operating the lever 6 until contact between the beveled peripheral portions of these gears is made. At this time, power will be transmitted from the driving shaft 2 through the medium of the interengaged gears 3 and 9 to the shaft 2. Different driving relations between the driving gear 3 and the driven gear 9 may be readily effected by further manipulation of the operating lever 6 in a direction to cause movement of the driving gear to or from the driven gear 9, contact between said driving gear and driven gear being maintained due to the provision of the compensating means in form of the links 12 and the coiled spring 18; the driven gear of course automatically adjusting itself with relation to the driving gear 3 to insure proper contact between the same. To obtain a reverse drive through the transmission, the driven gear 9 is moved laterally out of engagement with the driving gear 3 whereupon the operating lever 16 is rocked to cause the engaging of the second driven gear with the driving gear 3. Due to the arrangement of this gear 10 with relation to the driving gear it of course will be understood that the desired reverse drive through the transmission will be produced. Variable speed ratios can of course be also obtained in the reverse direction merely by shifting the driving gear 3 through the medium of the operating lever 6 therefor with relation to the gear 10, said gear 10 automatically adjusting itself to insure proper contact or connection between the same and the driving gear.

Manifestly, the construction shown is capable of considerable modification and such modification as is within the scope of my claims, I consider within the spirit of my invention.

I claim:

1. In a variable speed power transmission, driving and driven shafts, a friction gear splined to the driving shaft, spaced friction gears splined to the driven shaft, independent means for shifting said gears to effect engagement therebetween the shifting means for gears of the driven shaft including resilient elements engaging the gears on the driven shaft to allow relative adjustment between the same and the gear on said driving shaft during shifting of the latter to obtain different speed ratios.

2. In a variable speed power transmission, driving and driven shafts, said driving shaft being disposed at substantially right angles to the intermediate portion of the driven shaft, a friction gear splined to the driving shaft, spaced friction gears splined to the driven shaft, independent means for shifting said gears to effect engagement therebetween, the shifting means for the gears of the driven shaft including yieldable elements engaging the gears on the driven shaft to allow relative adjustment between the same and the gear on said driving shaft during shifting of the latter to obtain different speed ratios.

3. In a variable speed power transmission, driving and driven shafts, said driving shaft being disposed at substantially right angles to the intermediate portion of the driven shaft, a beveled friction gear splined to the driving shaft, an operating lever connected to said gear, spaced beveled friction gears splined to the intermediate portion of the driven shaft, operating levers for said second friction gears, slotted webs arranged on the opposite sides of the second friction gears, links slidably and pivotally engaged in said slotted webs and having pivotal connection with the respective operating levers therefor whereby to permit said second friction gears to automatically adjust themselves with relation to the first friction gear during shifting of the latter to obtain a desired speed ratio, and a gear mounted on the intermediate portion of the driven shaft between said second friction gears.

In testimony whereof I affix my signature hereto.

EDWARD C. BOHLMANN.

Copies of this patent may be obtained for five cents each, by addressing the "Commissioner of Patents, Washington, D. C."